(12) United States Patent
Wu

(10) Patent No.: US 6,826,718 B1
(45) Date of Patent: Nov. 30, 2004

(54) METHOD AND APPARATUS FOR TRACKING CALL PROCESSING FAILURE DATA IN A RADIOTELEPHONE SYSTEM

(75) Inventor: Chuyun Wu, Dublin, OH (US)

(73) Assignee: SBC Holdings Properties, L.P., Reno, NV (US)

(*) Notice: Subject to any disclaimer, the term of this patent is extended or adjusted under 35 U.S.C. 154(b) by 0 days.

(21) Appl. No.: 09/354,049

(22) Filed: Jul. 15, 1999

(51) Int. Cl.[7] .............................................. G06F 11/00
(52) U.S. Cl. ...................... 714/46; 379/1.01; 379/9.04; 379/112.01; 379/112.08; 379/133; 379/134
(58) Field of Search .................. 714/46, 47, 6, 714/7, 26, 48; 379/1.01, 9.04, 14, 112.01, 114.01, 133, 134, 112.08, 165; 370/242; 455/343, 423, 67.1; 340/539; 360/902; 709/203

(56) References Cited

U.S. PATENT DOCUMENTS

| | | | | |
|---|---|---|---|---|
| 4,975,942 A | * | 12/1990 | Zebryk | 379/144 |
| 5,023,900 A | | 6/1991 | Tayloe et al. | |
| 5,287,505 A | * | 2/1994 | Calvert et al. | 707/10 |
| 5,353,334 A | * | 10/1994 | O'Sullivan | 455/557 |
| 5,490,204 A | * | 2/1996 | Gulledge | 455/423 |
| 5,517,555 A | | 5/1996 | Amadon et al. | |
| 5,537,611 A | * | 7/1996 | Rajagopal et al. | 379/221.07 |
| 5,551,025 A | * | 8/1996 | O'Reilly et al. | 707/104.1 |
| 5,576,689 A | * | 11/1996 | Queen | 340/514 |
| 5,594,861 A | * | 1/1997 | Jonsson et al. | 714/2 |
| 5,642,396 A | * | 6/1997 | Cowgill | 379/14 |
| 5,694,451 A | * | 12/1997 | Arinell | 379/32.04 |
| 5,696,809 A | | 12/1997 | Voit | |
| 5,706,333 A | * | 1/1998 | Grenning et al. | 455/423 |
| 5,761,429 A | | 6/1998 | Thompson | |
| 5,787,164 A | | 7/1998 | Haines et al. | |
| 5,859,894 A | | 1/1999 | Ortiz Perez et al. | |
| 5,872,911 A | * | 2/1999 | Berg | 714/43 |
| 6,028,914 A | * | 2/2000 | Lin et al. | 379/14 |
| 6,141,777 A | * | 10/2000 | Cutrell et al. | 714/47 |
| 6,449,341 B1 | * | 9/2002 | Adams et al. | 379/9 |

* cited by examiner

*Primary Examiner*—Robert Beausoliel
*Assistant Examiner*—Michael Maskulinski
(74) *Attorney, Agent, or Firm*—Brinks Hofer Gilson & Lione

(57) ABSTRACT

A system (102) for monitoring call processing failures in a radiotelephone network (100) includes a server (140) coupled with the radiotelephone network and configured to receive call processing failure data. The system further includes a plurality (142) of clients configured to be coupled to the server on a network (144) for display and analysis of the call processing failure data. The clients may include a portable client (152, 154) for remote or wireless access to call processing failure data at the server, permitting troubleshooting and failure analysis in the field. The client computers are preferably Windows-based and provides both analog (AMPS) and digital call processing failure counts.

10 Claims, 9 Drawing Sheets

| Real Time Call Processing Failure BLOOMFIELD | | | | | | | | | | | | | | | |
|---|---|---|---|---|---|---|---|---|---|---|---|---|---|---|---|
| File  Analog  Digital  Switches | | | | | | | | | | | | | | | |
| Total Analog 6,879  < Back  Next >  Last CPF: 5/11, 15:40  Total Digital 12,810  < Back  Next >  Last CPF: 5/11, 15:40 | | | | | | | | | | | | | | | |
| CELL | ANT | RA | TOT | LC | LCST | LCAA | LCAC | VCCF | CST | CS | ACF | FRT | NCT | OCT | TAF | GCME |
| 13 | 3 | 5 | 23 | 2 | 0 | 2 | 2 | 20 | 0 | 0 | 0 | 0 | 1 | 0 | 0 | 0 |
| 177 | 0 | 1 | 23 | 21 | 8 | 13 | 0 | 1 | 0 | 0 | 1 | 0 | 0 | 0 | 0 | 0 |
| 105 | 1 | 19 | 22 | 13 | 8 | 1 | 4 | 6 | 0 | 0 | 1 | 0 | 1 | 1 | 0 | 0 |
| 123 | 3 | 4 | 20 | 15 | 9 | 6 | 0 | 3 | 0 | 0 | 2 | 0 | 1 | 0 | 0 | 0 |
| 78 | 2 | 10 | 19 | 8 | 6 | 1 | 1 | 8 | 0 | 1 | 0 | 0 | 1 | 0 | 0 | 0 |
| 122 | 2 | 11 | 19 | 1 | 0 | 0 | 1 | 17 | 0 | 0 | 2 | 0 | 0 | 1 | 0 | 0 |
| 29 | 3 | 4 | 19 | 3 | 2 | 2 | 1 | 6 | 0 | 5 | 0 | 0 | 1 | 0 | 0 | 6 |
| 166 | 1 | 3 | 19 | 7 | 2 | 0 | 4 | 6 | 0 | 1 | 0 | 0 | 1 | 1 | 0 | 0 |
| 6 | 2 | 12 | 19 | 5 | 0 | 1 | 4 | 11 | 0 | 0 | 0 | 0 | 1 | 0 | 0 | 0 |
| 24 | 2 | 10 | 18 | 10 | 2 | 1 | 7 | 7 | 0 | 0 | 0 | 0 | 1 | 1 | 0 | 0 |

| CELL | ANT | CCU | CE | TOT | ACF | CAF | CHPF | CS | CST | FECP | FRT | GCME | LC | RCF | SCG | TCCF |
|---|---|---|---|---|---|---|---|---|---|---|---|---|---|---|---|---|
| 65 | 1 | 2 | 4 | 32 | 0 | 0 | 0 | 6 | 0 | 0 | 0 | 0 | 1 | 1 | 0 | 24 |
| 65 | 2 | 1 | 0 | 30 | 0 | 1 | 0 | 6 | 0 | 0 | 1 | 0 | 3 | 2 | 0 | 17 |
| 65 | 1 | 1 | 8 | 30 | 0 | 0 | 0 | 8 | 0 | 0 | 0 | 0 | 1 | 0 | 0 | 21 |
| 108 | 3 | 2 | 8 | 30 | 0 | 0 | 0 | 3 | 0 | 0 | 0 | 0 | 10 | 4 | 0 | 12 |
| 110 | 1 | 2 | 5 | 29 | 0 | 0 | 0 | 7 | 0 | 0 | 1 | 0 | 2 | 2 | 0 | 18 |
| 65 | 3 | 2 | 6 | 29 | 0 | 0 | 0 | 3 | 0 | 0 | 0 | 0 | 2 | 0 | 0 | 23 |
| 129 | 1 | 2 | 1 | 28 | 0 | 0 | 0 | 3 | 0 | 0 | 1 | 0 | 7 | 4 | 0 | 14 |
| 65 | 2 | 2 | 2 | 28 | 0 | 0 | 0 | 2 | 0 | 0 | 0 | 0 | 2 | 0 | 0 | 23 |
| 65 | 2 | 2 | 9 | 27 | 0 | 0 | 0 | 4 | 0 | 0 | 0 | 0 | 2 | 1 | 0 | 20 |
| 129 | 2 | 2 | 4 | 26 | 0 | 0 | 0 | 0 | 0 | 0 | 0 | 0 | 7 | 4 | 0 | 15 |

FIG. 8

| Analog CPF In Detail | | | | | | |
|---|---|---|---|---|---|---|
| (810) 506-1797 | a | d3313d69 | 0511:0008 | 00c177+001.788 | d5-177 | AO | LCST |
| (248) 701-1389 | a | ed7be909 | 0511:0027 | 00c177+001.788 | d5-177 | AO | LCAA |
| (248) 701-1389 | a | ed7be909 | 0511:0035 | 00c177+001.788 | d5-177 | AO | LCAA |
| (248) 224-1935 | a | ed9d7ed4 | 0511:0521 | 00c177+001.788 | d5-177 | AT | LCST |
| (099) 887-1364 | 8 | df61b8e9 | 0511:0622 | 00c177+001.788 | d5-177 | UO | VCCF |
| (248) 462-3209 | e | d42d8387 | 0511:0642 | 00c177+001.788 | d5-177 | AO | LCAA |
| (248) 933-0591 | a | df6e267e | 0511:0655 | 00c177+001.788 | d5-177 | AO | LCST |
| (248) 462-8201 | a | db89375c | 0511:0716 | 00c177+001.788 | d5-177 | UO | LCAA |
| (248) 420-2570 | a | c9451df7 | 0511:0724 | 00c177+001.788 | d5-177 | AO | LCST |
| (248) 892-6911 | a | 9f0d91e1 | 0511:0840 | 00c177+001.788 | d5-177 | AO | LCST |

Enter number for search: (810) 506 - 1797  Search  Total Counts: 23  Close

FIG. 9

| Digital CPF In Detail | | | | | | | | |
|---|---|---|---|---|---|---|---|---|
| (248) 225-1564 | c9451b22 | 0511:0035 | 3c65-18.2.7 | 996.27 | UO | TCCF | | |
| (248) 217-0999 | d3212680 | 0511:0100 | 3c65-18.2.7 | 996.56 | AO | CS | 0c2-0.0.0e0 | |
| (313) 318-8140 | c941af83 | 0511:0737 | 1c65-10.2.7 | 993.633 | UO | TCCF | | |
| (810) 413-7775 | c9648ee9 | 0511:0838 | 1c65-18.2.7 | 996.300 | AT | CS | 0c65-0.0.0e0 | |
| (248) 933-8605 | d315dad0 | 0511:0844 | 2c65-18.2.7 | 996.88 | UO | GCMB | | |
| (248) 231-2371 | 9f2c89a9 | 0511:0858 | 2c65-18.2.7 | 996.449 | UT | TCCF | | |
| (248) 225-8208 | eb2a7d1c | 0511:0920 | 3c65-18.2.7 | 996.234 | UT | TCCF | | |
| (313) 682-4439 | eb2a8ab6 | 0511:0931 | 1c65-10.2.7 | 993.599 | UT | TCCF | | |
| (248) 882-5111 | d32299ce | 0511:0943 | 1c65-18.2.7 | 996.303 | AO | LC | 0c65-0.0.0e0 | 0c53-0.0.0e0 |
| (248) 225-8696 | c965eb63 | 0511:1006 | 1c65-18.2.7 | 996.129 | UO | TCCF | | |

Enter number for search: (248) 225 - 1564  Search  Total Counts: 32  Close

METHOD AND APPARATUS FOR TRACKING CALL PROCESSING FAILURE DATA IN A RADIOTELEPHONE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

MICROFICHE APPENDIX

A microfiche appendix of computer program source code is included and comprises 2 sheets and a total of 114 frames.

The Microfiche Appendix is hereby expressly incorporated herein by reference, and contains material which is subject to copyright protection as set forth above.

BACKGROUND OF THE INVENTION

The present invention relates generally to monitoring and control of wireless telecommunication systems. More particularly, the present invention relates to a method and apparatus for tracking call processing failure data in a radiotelephone system.

Radiotelephone systems are wireless telecommunication systems in which a two-way radio communication link is established between one or more base stations and a mobile station. As the mobile station moves around the geographic area covered by the system, the communication is handed off from one base station to another. Radiotelephone systems include cellular telephone systems, personal communication systems (PCS), trunked radio systems and others.

Call processing failures occur in radiotelephone systems for a variety of reasons. Transmission from a local station may be unexpectedly interrupted if the mobile station enters a tunnel or loses battery power. During handoff, communication with the old base station may be terminated before initiation of communication with the new base station. Other reasons exist as well, such as co-channel and adjacent channel interference.

Many such call processing failures occur randomly. However, a large percentage of call processing failures may occur due to the same cause. Such a cause might be an otherwise undetected equipment failure. Another cause might be a break in coverage pattern of the system, where handoff failures occur. If such causes can be detected, they can be corrected and overall system performance improved.

One previous technique for tracking call processing failures uses a software program running on a personal computer (PC) coupled to a cellular processor of a cellular telephone system. The PC program reads radiotelephone data for call processing failures of an analog phone system and provides counts of the failure by type.

While useful, this previous solution has not kept up as cellular systems expanded. For example, the PC connects to a port of the cellular processor and collects data for a single switch of the cellular telephone system. Data for other switches in the system are not available to that PC. The PC is not portable, but requires a hard-wired connection directly to the cellular processor. The former system only reads call processing failures in an analog advanced mobile phone system (AMPS), not the digital systems currently being deployed. Only failure count totals are available. No details on individual call processing failures can be accessed. Further, only real time data are available. Historical failure data are lost.

Accordingly, there is a need for an improved method and apparatus for tracking call processing failure data in a radiotelephone system.

BRIEF DESCRIPTION OF THE DRAWINGS

FIG. 8 is a screen view of a client computer;

FIG. 9 is a screen view of detailed call processing failure data for an analog radiotelephone system; and FIG. 10 is a screen view of detailed call processing failure data for a digital radiotelephone system.

DETAILED DESCRIPTION OF THE PRESENTLY PREFERRED EMBODIMENTS OF THE INVENTION

By way of introduction, in one embodiment the present invention provides a Windows-based server/client program that displays call processing failures in real time. In addition, the embodiment also displays archived call processing failure data in history. The embodiment provides twelve different analog (advanced mobile phone system or AMPS) call processing failure counts and twelve different digital (code division multiple access or CDMA or other digital system) call processing failure counts with sorting options, detailed display and mobile station search capabilities. All components of the system are combined in a local area network or wide area network to provide flexible extension and expansion of the system. Any suitable personal computer can be used for the client, including portable laptop or other computers connected via wireless link to the network. Thus, the present embodiment uses conventional hardware and takes advantage of advanced computer technology to provide a full-featured, user-friendly interface for real-time troubleshooting of cellular network systems.

Figure 1:
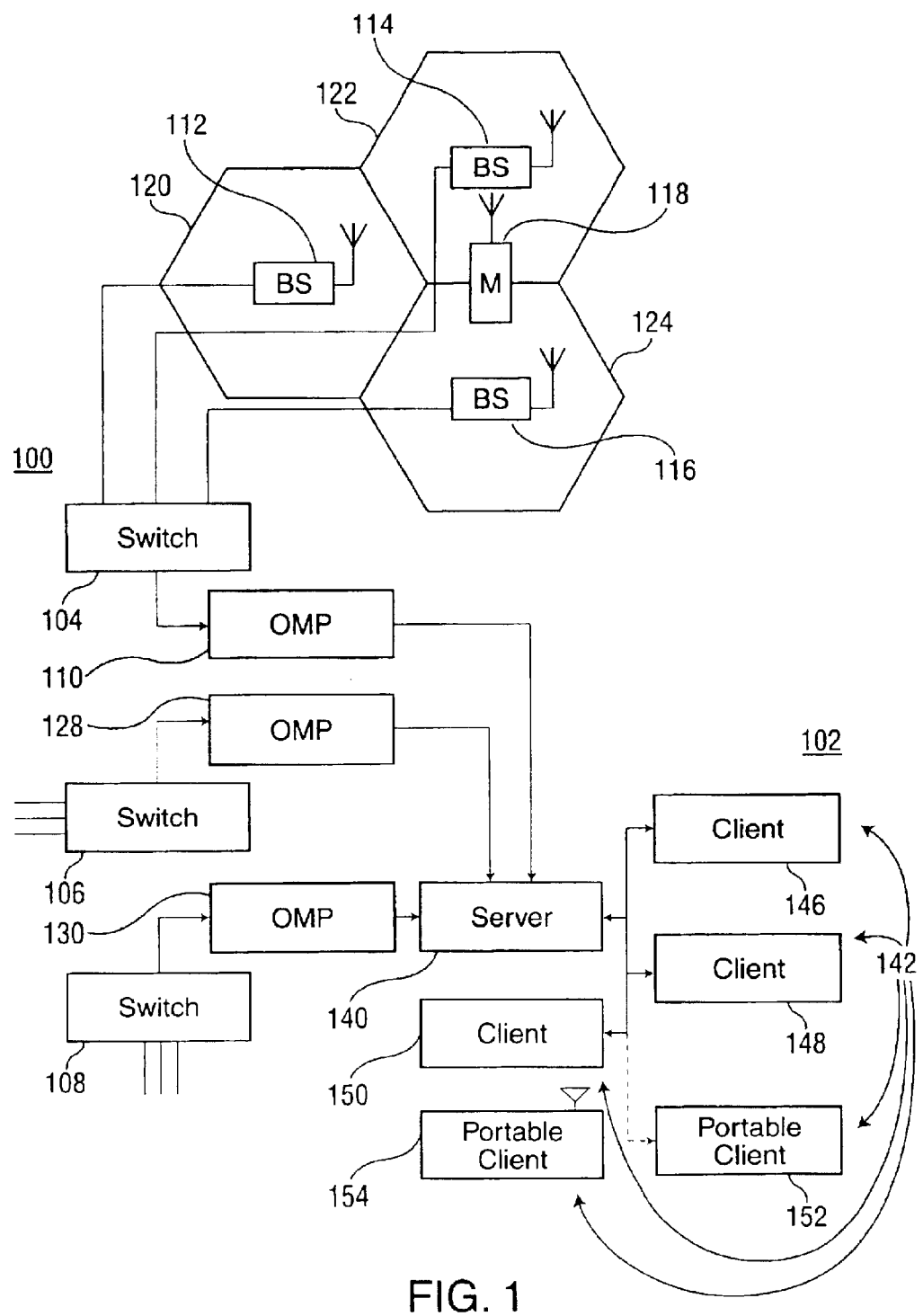
FIG. 1 is a block diagram of a radiotelephone system and associated system for monitoring call processing failure data in the radiotelephone system.

Referring now to the drawing, FIG. 1 shows a block diagram of a radiotelephone system 100 and an associated system 102 for monitoring call processing failure data in the radiotelephone system 100. In the illustrated embodiment, the radiotelephone system 100 is a cellular telephone system. However, in alternative embodiments, the radiotelephone system may be a personal communication system (PCS), trunked radio system or other system providing radio communications between fixed radio stations and mobile radio stations.

In the illustrated embodiment, the radiotelephone system 100 includes a plurality of switches including switch 104, switch 106 and switch 108. Associated with the switch 104 is an operations management platform 110 and a plurality of base stations including base station 112, base station 114 and base station 116. Each base station provides two-way communication with mobile stations such as mobile station 118 when the mobile station 118 is located in the geographic area served by the base station. Thus, the base station 112 serves a geographic area 120, the base station 114 serves a geographic area 122 and the base station 116 serves a geographic area 124. In FIG. 1, the geographic areas are illustrated as being hexagonal in nature. In other embodiments, the geographic areas may have any suitable shape and are generally overlapping. As the mobile station 118 moves among geographic areas, two-way communications between the mobile station and base stations are handed off from base station to base station. High level functions such as handoff and system control are handled by the switches including the switch 104. Switch 106 and switch 108 control a similar group of base stations. Depending on the embodiment, each switch may control more than 200 base stations and each base station may be in radio communication with dozens or hundreds of mobile stations in its associated geographic area.

As noted, associated with the switch 104 is an operations management platform (OMP) 110. Similarly, associated with switch 106 is an OMP 128 and associated with the switch 108 is an OMP 130. Each OMP serves as a data interface with its associated switch. In one embodiment, the OMPs comprise computer systems manufactured by Sun MicroSystems and operating in response to software provided by Lucent Technologies.

In conventional operation, each OMP monitors operation of its associated switch and receives data describing every operation performed within the radiotelephone system 100. For example, when a mobile station such as the mobile station 118 is turned on, the mobile station registers with the nearest base station, such as the base station 114. The OMP 110 detects and records the registration operation. Further, when the mobile station 118 initiates a phone call, the OMP detects and records the attempt to place a call. Stored data include identification for the mobile station 118, the time of day of the call attempt and the called telephone number. If the mobile station 118 is moving, handoff from one base station to another may be necessary. The OMP records all of the control signals between the switch and the base stations involved in the handoff procedure as well as the control communication between the mobile station 118 and the base stations. As a further example, when the user of the mobile station 118 turns off the mobile station, the mobile station de-registers with the system before powering off. The OMP further records this event. If a call processing failure occurs, the OMP 110 records the call processing failure. For example, if the mobile station 118 moves into a tunnel or a building so that two-way radio communication is interrupted and an active call is dropped, the OMP records this call processing failure.

By recording all activity in the system associated with the switch, the OMP generates tremendous amount of data. This data may include 100,000 records and 30 megabytes per day. The data produced by the OMPs 110, 128, 130 is available at each OMP on a real time basis, i.e., as each event occurs, and is further archived by storing the data in a suitable storage medium.

The system 102 for monitoring call processing failure data in the radiotelephone system 100 includes a server 140 and a plurality 142 of clients linked together by a network 144. The plurality 142 of clients includes in one embodiment several client computers which comprise of personal computers (PCs) located on a desktop or in a service facility accessible by the network. This includes client 146, client 148 and client 150. The plurality 142 of clients further includes a dial-up client 152 which may be connected to the network 144 over a computer modem. Still further, the plurality 142 of clients includes a portable client 154 which connects to the network 144 using a wireless link. The wireless link in one example uses cellular digital packet data (CDPD) for wireless communication of digital data. Structure and operation of a typical client computer will be described in further detail below in conjunction with FIG. 3.

The server 140 is coupled to each of the OMPs 110, 128, 130 for receiving call data from the radiotelephone system 100. The call data includes all data provided by the switches 104, 106, 108 through the OMP 110, 128, 130. As noted above, this is a very large amount of data and includes data corresponding to all operations within the radiotelephone system 100. The server 140 identifies call processing failure data in the call data. This may be done, for example, by identifying characteristic patterns in the data, reading record information associated with the data or by any suitable method. Further, the server 140 organizes the call processing failure data according to call failure type. Possible types of call failure data will be described further below. Still further, the server 140 transmits selected call processing failure data to a client computer in response to a request from the client computer. The selected call processing failure data are transmitted over the network 144. If the requesting client computer is portable, the select data may be transmitted using a wireless link, for example to a portable client computer 154, or using a modem over a standard telephone land line connection to the portable client 152. Still further, the server 140 preferably stores all call processing failure data as archived data. After filtering unwanted call event data which includes, for example data from the OMPs 110, 128, 130 which is not related to call processing failures, the server 140 stores in an associated memory the remaining call processing failure data. The server 140 transmits the current call processing data in response to a request from the client computer. The current data includes real time data which is data currently produced by a switch or an OMP in response to a current event in the radiotelephone system 100. The server further transmits archived data in response to an archived data request from the client computer. Structure and operation of the server computer 140 will be described further below in conjunction with FIG. 2.

Figure 2:
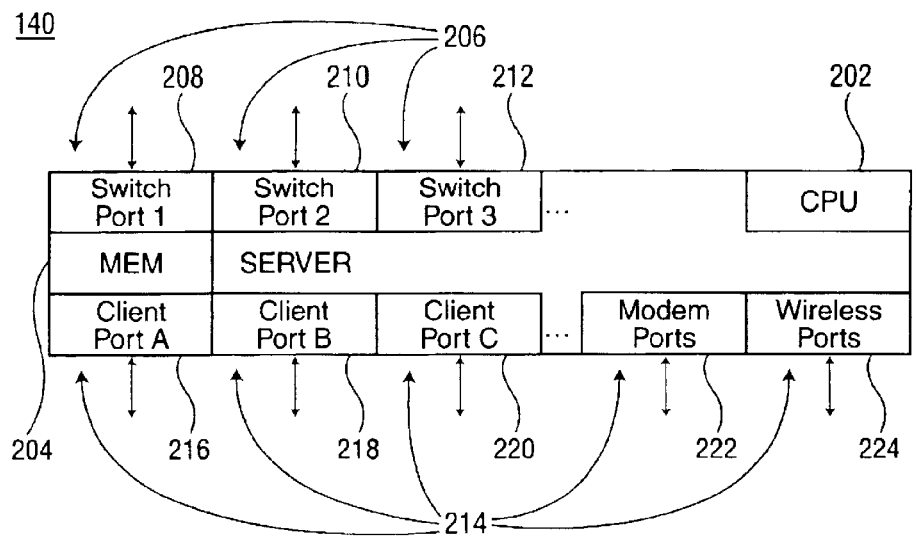
FIG. 2 is a block diagram of a server for use in the system of FIG. 1.

FIG. 2 is a block diagram of a server 140 for use in the system 102 of FIG. 1. In FIG. 2, the server 140 includes a central processing unit (CPU) 202, a memory 204, a plurality of switch ports 206 including a first switch port 208, a second switch port 210 and a third switch port 212. The server 140 further includes a plurality of client ports 214 including a first client port 216, a second client port 218, a third client port 222, one or more modem ports 222 and one or more wireless ports 224. In the illustrated embodiment, the server 140 is formed using a Sun MicroSystems SPARC computer. Suitable models include a SPARC-2, 4 or 5 or similar data processing equipment. The CPU 202 operates in conjunction with instructions and data stored in the memory 204.

Each of the switch ports 208, 210, 212 is coupled to a switch of the radiotelephone system such as radiotelephone system 100 (FIG. 1). If an OMP is coupled to the switch, the switch port may be coupled to the switch through the OMP. The switch ports serve to provide wire line communication with the switches. This may be two-way communication but is at least one-way communication, with the switch ports receiving data from the switch or the OMP. The data received by the switch ports is data corresponding to events occurring in the radiotelephone system. The switch ports 208, 210, 212 receive the data as communicated and convert the data to a form for subsequent processing by the server 140. As noted above, the server 140 serves to identify call processing failure data in the large amount of data received from the switches. Data unrelated to call processing failures is discarded. Data related to or indicative of call processing failures is provided to one or more client ports and stored in the memory 204 as archived data. The memory may comprise semi-conductor memory, disk memory or any other suitable storage medium as known to those ordinarily skilled in the art.

The client ports 216, 218, 220, 222, 224 provide communication between the server and associated client computers. In the preferred embodiment, one or more client computers is networked with the server 140 over a local area network or wide area network. Communication on this wire line network preferably occurs using a digital data transmission protocol which may be a standard protocol such as TCP/IP. Alternatively, communication may be achieved between the server and client computers using any suitable proprietary or other protocol. The modem ports 222 provide two-way communication using standard modem protocols, as known in the art. Such modem communication may occur over a wire line, such as the public switched telephone network (PSTN). Alternatively, such modem communication may occur using wireless equipment, such as cellular modems. The wireless ports 224 provide wireless communication using any suitable wireless data transmission protocol or conventional technique. One example is CDPD. The wireless ports 224 may include radio transmission and reception equipment to permit radio communication with a remote, portable client.

The modem ports 222 and the wireless parts 224 allow client-server communication between the server 144 and portable client computers. This increases the flexibility of the system 102 (FIG. 1) by permitting portable personal computers such as laptop computers to be transported to remote sites such as a base station location for troubleshooting the radiotelephone system 100. A link may be made between the portable computer and a modem port 222 using a wire line, a cellular modem or a wireless port using a CDPD or similar connection. At the remote location, call processing failure data can be accessed from server 140 for real time monitoring of the system 100.

Figure 3:
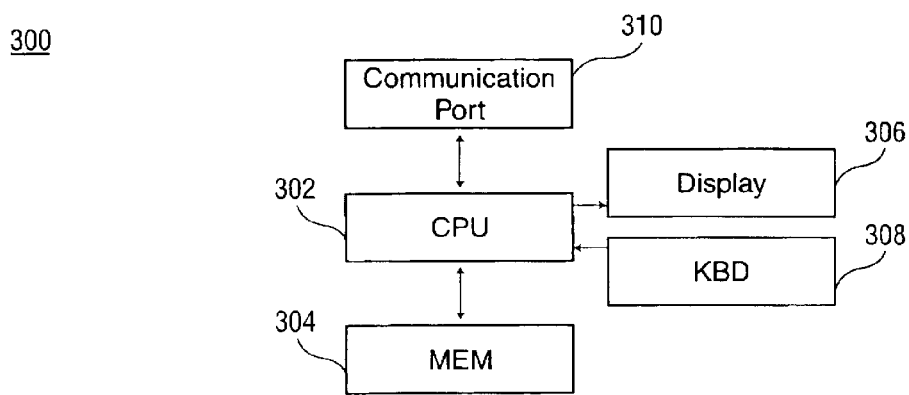
FIG. 3 is a block diagram of a client for use in the system of FIG. 1.

FIG. 3 is a block diagram of a client computer 300 for use in the system 102 of FIG. 1. The client computer 300 includes a central processing unit (CPU) 302, a memory 304, a display 306, a keyboard 308 and a communication port 310. The client computer in the preferred embodiment is a networked personal computer (PC) running a suitable operating system such as Windows 95, Windows 98, or Windows NT 4.0, all available from Microsoft Corporation. The client computer 300 may be a desktop computer located in an office or laboratory. In alternative embodiments, the client computer 300 may be a portable computer such as a laptop or a palmtop computer capable of remote communication with a server such as the server 140 illustrated in FIG. 2.

CPU 302 operates in response to data and instructions in the memory 304. The display 306 may be any suitable video display terminal or other device. The keyboard 308 preferably includes an alphanumerical keyboard and other manual data entry device, such as a mouse or joystick. Such equipment is typically provided in computers which employ a graphical user interface, such as the Windows system.

The communication port 310 provides data communication with a server such as the server 140 of FIG. 2. The communication port 310 provides suitable access to a network for communicating with the server 140. If the client computer 300 is a desktop computer not intended to be transported to remote facilities, the communication might be an ethernet card or other wire line data interface. In contrast, if the client computer 300 is a laptop, palmtop or other portable computer, the communication port 310 may include a wireless or modem interface instead of or in addition to the wire line interface. In this manner, the communication port 310 allows the client computer 300 to remotely access the server 140 either using a dial-up modem, wireless modem or other wireless communication.

Figure 4:
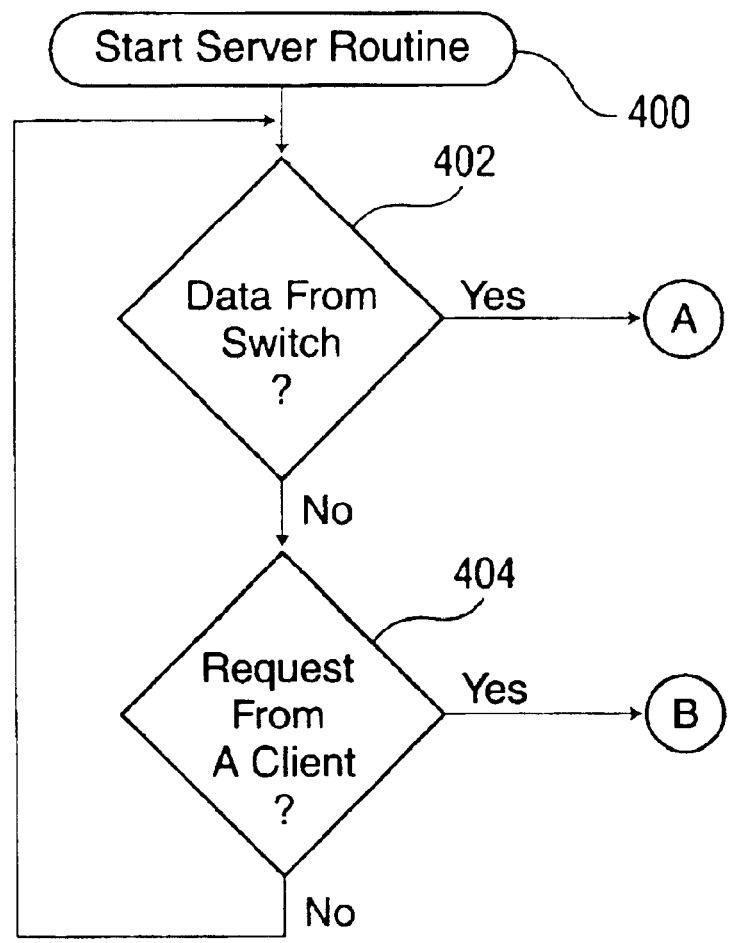
FIGS. 4–6 are flow diagrams illustrating a method for operating the server of FIG. 2 in the system of FIG. 1.
Figure 5:
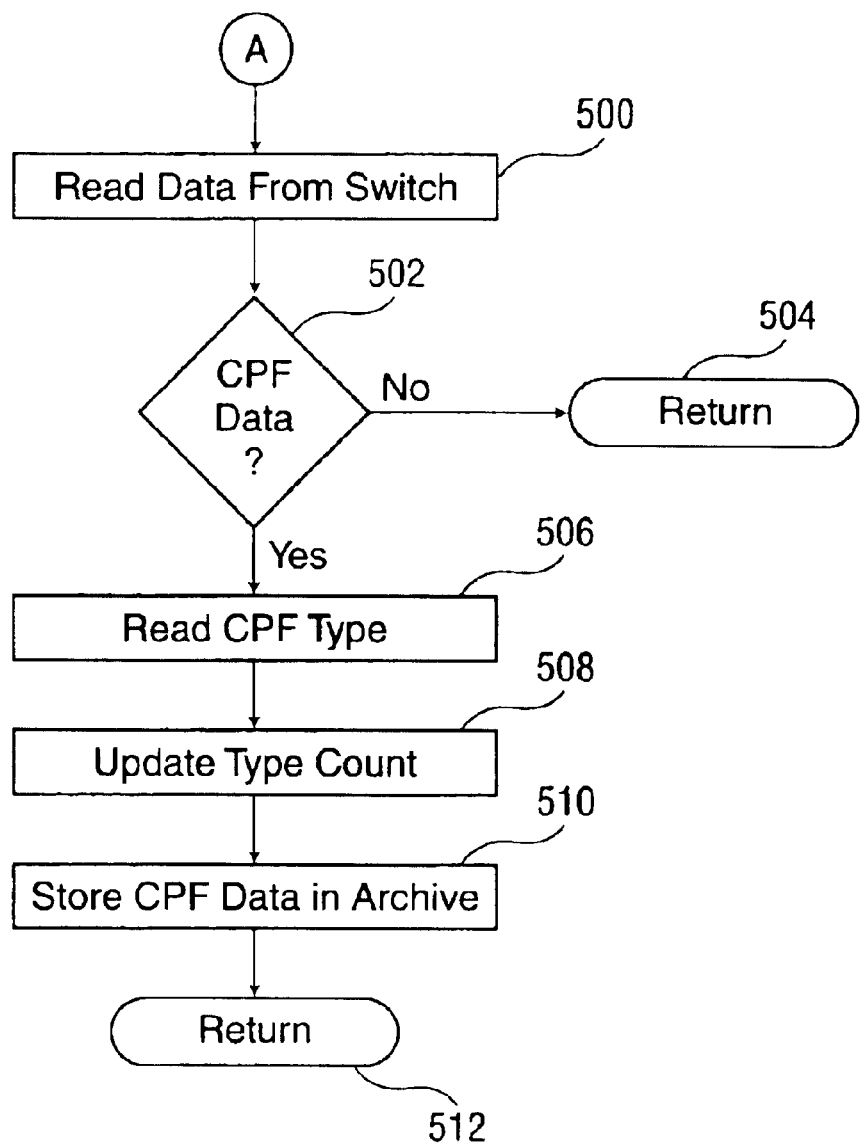
Figure 6:
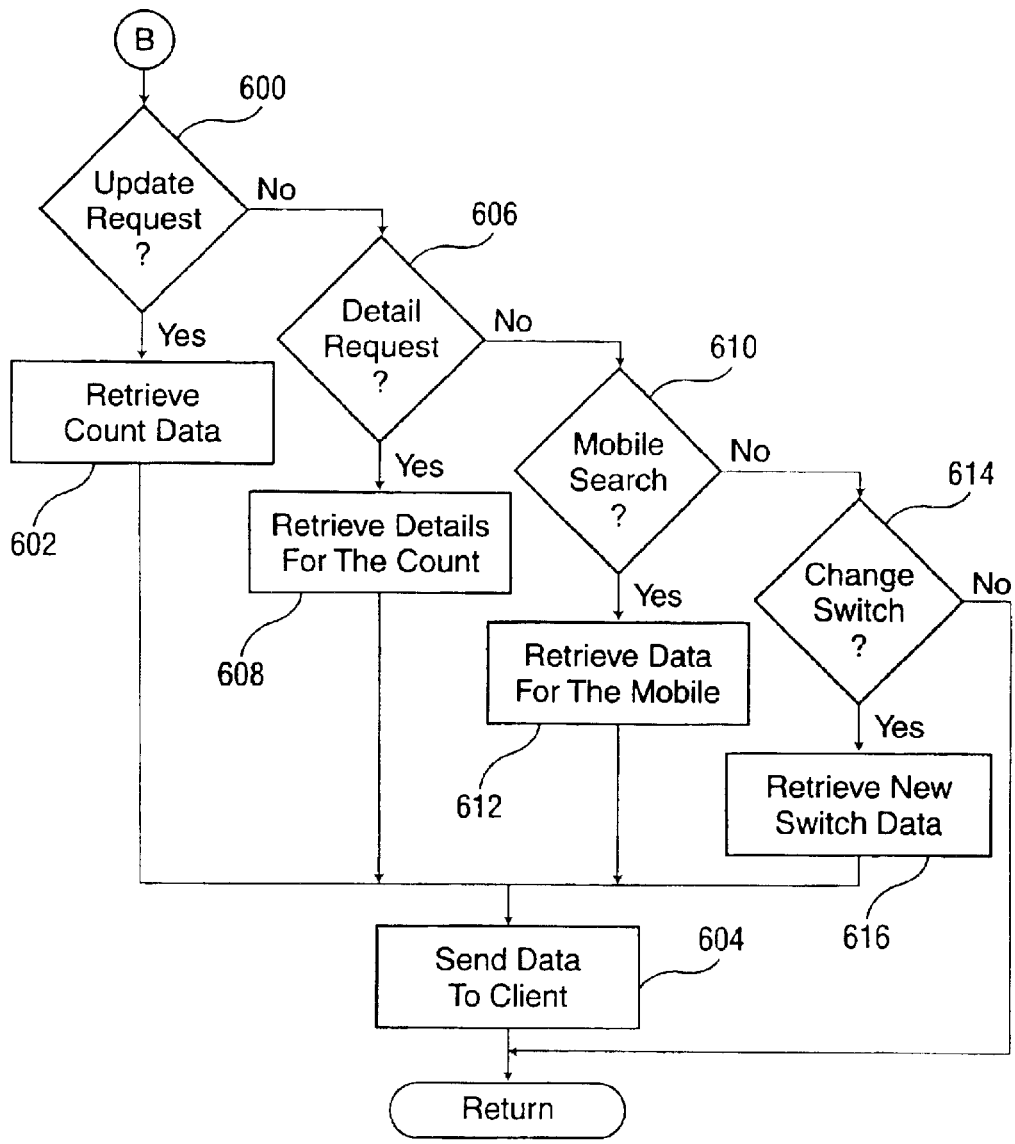

FIG. 4, FIG. 5 and FIG. 6 are flow diagrams illustrating a method for operating the server 140 of FIG. 2 in the system 102 of FIG. 1. The method steps illustrated in these flow diagrams are preferably implemented in one or more software routines which may be run on the server computer 140 of FIG. 2. The computer program source code contained in the Microfiche Appendix to this patent application contains an exemplary embodiment of such software.

In FIG. 4, the method begins at step 400. At step 402, the server determines if data has been received from a switch of the radiotelephone system. In the illustrated embodiment, data corresponding to all events in the radiotelephone system are written by a switch or an OMP to a server. The server detects the data. If data is present, the server continues processing at step 500 (FIG. 5). If no data are present, control proceeds to step 404. At step 404, the server determines if a request for data has been received from a client. If so, control proceeds to step 600 (FIG. 6). If not, control returns to step 402 and the server remains in a loop until either data is received from a switch or a request is received from a client or other processing is required.

Referring now to FIG. 5, it shows in further detail a method of operating the server 140 of FIG. 2. At step 500, call data from the switch are read by the server. If the switch is equipped with an OMP, the OMP automatically detects all events occurring within the switch and its associated base stations. The OMP makes call data related to these events available on a real time basis. In addition, the OMP stores this data for archive purposes.

At step 502, the server determines if the current call data received from the switch is call processing failure (CPF) data. If not, the data is rejected and control returns to the flow diagram of FIG. 4. In the present embodiment, the server filters out call data which are not related to call processing failures. If the call data is related to a call processing failure, at step 506, the server reads the call processing failure type. The call data may be of one or more specified types as will be described below. The type information may be contained in a header or other data field contained in the call data received from a switch. At step 508, a type count associated with the CPF type is updated, for example by incrementing. At step 510, the call processing failure data are stored in an archive. Control then returns to the flow diagram of FIG. 4.

Referring now to FIG. 6, if the server receives a request for data from a client computer over a network, the server determines the type of request received. At step 600, the server determines if the request is a request for an update of information previously sent to the client computer. If so, at step 602, the server retrieves the count data associated with each of the call processing failure types previously stored (FIG. 5) and at step 604 sends the count data to the requesting client computer.

At step 606, the server computer determines if the request from the client computer is a request for detailed data on a particular count. If so, at step 608, the server computer retrieves the details for the specified count and at step 604, sends the data to the client. At step 610, the server computer determines if the request from the client computer was a request for a mobile search. Such a request would include a serial number or telephone number for a particular mobile station in the system. If so, at step 612, the server retrieves the data for the identified mobile station and at step 604, sends the retrieved data to the client computer over the network. At step 614, the server computer determines if the request from the client computer is a request to change the switch of the radiotelephone system for which data is presented. If so, at step 616, the data associated with the new switch is located and retrieved and at step 604 the data is sent to the client. Control then returns to the flow diagram of FIG. 4.

Figure 7:
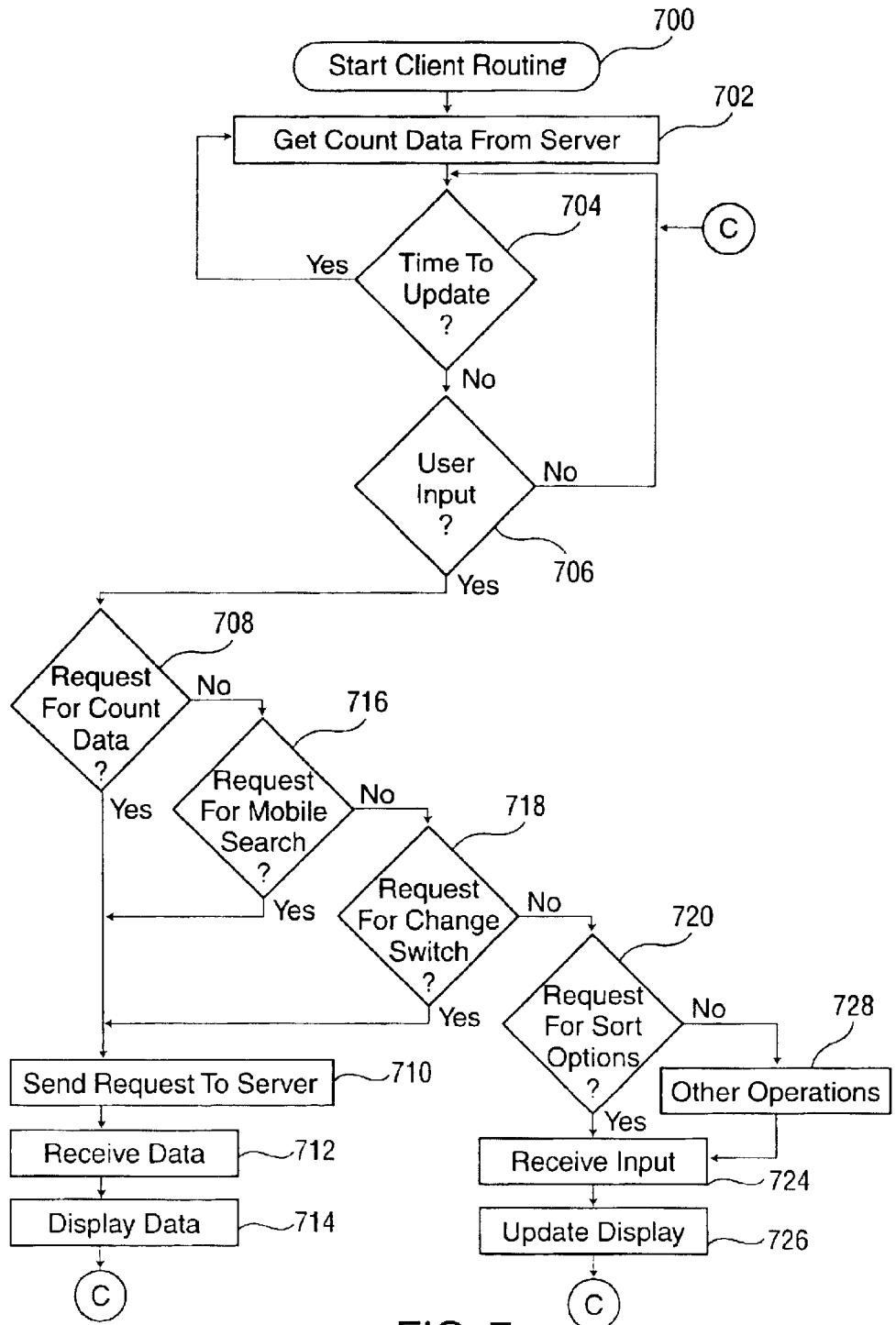
FIG. 7 is a flow diagram illustrating a method for operating the client of FIG. 3 in the system of FIG. 1.

FIG. 7 is a flow diagram illustrating a method for operating the client computer of FIG. 3 in the system of FIG. 1. An exemplary embodiment of the method steps shown in FIG. 7 is contained in the Microfiche Appendix including computer programs source code included with this patent application. The method begins at step 700.

At step 702, to initiate operation of the client computer, the client computer retrieves count data from the server over a network. Once the count data are retrieved, the client computer produces a display using the retrieved data and remains in a loop awaiting either update of the data, step 704 or user input, step 706.

An example of the display produced by the client computer is shown in FIG. 8. As can be seen in FIG. 8, the display preferably is a Windows-type display and uses conventional Windows icons for graphical user interface. Pop-up menus are located behind the icons labeled File, Analog, Digital and Switches. The display 800 is divided into an upper portion 802 and a lower portion 804. In the illustrated embodiment, the upper portion 802 displays call processing data for an analog cellular telephone system and the lower portion 804 contains call processing failure data for a digital cellular telephone system. Identifying information is arranged along the left-hand side of the upper portion 802 and the lower portion 804. The identifying information includes a base station identifier (CELL), and an antenna identifier (ANT). The call processing failure data is sorted by the total number of failures (TOT) with the greatest number of failures listed highest in the portion of the display. Failure counts are listed across the respected columns of the display. The failure types for the illustrated embodiment are described below.

Analog failure types include the following:

Lost Call (LC).

This is the most common CPF. There are three causes for the failure. First, the base station of the cell has lost supervisory audio tone or SAT from the mobile station (Lost Call due to SAT timeout, LCST). Second, the mobile failed an Audit (Lost Call due to AMPS Audit failure, LCAA). Or third, the mobile had a sudden unexplained power drop (Lost Call due to AMPS Catastrophic power drop, LCAC).

The cell begins a SAT Fade Timer when it loses SAT from the mobile. When this timer expires without acquiring SAT from the mobile, the cell turns off the voice radio and terminates the call, creating a call processing failure.

An audit occurs when the signal from the mobile unit becomes relatively weak. More specifically, an audit occurs when the signal strength drops below a Secondary Threshold programmed into the base station. The base station, using blank and burst, prompts the mobile for a response and the mobile returns a burst of ST. Failure of the cell to detect this response results in the call being terminated and pegged as a Lost Call, Audit Failure. Among many potential scenarios for LC's are:

The mobile leaves the service area while a call is in progress.
The mobile temporarily loses signal within the service area due to weak signal.
The mobile loses SAT from the system due to interference.
The cell loses SAT from the mobile due to interference or weak signal.
The mobile unit loses its power source.
The mobile radio or antenna is defective.
The cell radio or antenna is defective.

Voice Channel Confirmation Failure (VCCF).

This CPF occurs during the origination of an inbound or outbound call. After the initial voice channel assignment, cells are programmed to wait a few seconds on the voice channel for the mobile. If the cell does not detect the proper SAT within the given time frame, it will turn off the cell radio and end the call. The signal strength must also be above the Voice Channel Confirmation Threshold of the site. This results in a Fast Busy to the customer at the mobile station. The Voice Channel Confirmation Threshold of the cell is usually programmed to allow minimal signal. The VCCF rate is usually below 1%. Possible causes of this problem include the following:

Incorrect programming of the mobile Station Class Mark.
   Older mobile units were only capable of 666 channel operation. If the unit is programmed for 832 channel operation, the system will assign channels that the mobile cannot tune to.
Low battery or weak mobile power source.
Defective mobile transmitter, low output power or bad antenna.
Little or no mobile SAT deviation. Also, a few mobiles have been found to have trouble with only one particular SAT.
Weak coverage area within the network causes much fading.
Defective cell radio or antenna.

Alert Confirmation Failure (ACF).

The ACF is similar to the VCCF. The ACF occurs only during origination of an inbound call to the mobile. After the page response and initial voice channel assignment, the cell waits on the voice channel to detect ST from the mobile. Failure of the cell to detect ST within the proper time frame causes the cell to end the process. The mobile user is usually unaware of the failure, although some mobiles notify the user of a failed call attempt, (such as the "Failed Page Indicator" provided by mobile stations from Motorola, Inc., Schaumburg, Ill.). The calling party receives two rings, then a busy signal. This is due to the fact that the call process has proceeded beyond the point where it can be switched to secondary call treatment such as Voice Mail or No Page Response Recording. Common causes of this CPF include:

Low battery or weak mobile power source.
Little or no mobile ST deviation.
Defective mobile radio or antenna.
Defective cell radio.
Weak coverage within the network. During an inbound call to the mobile, the Page Response signal strength is not measured as the outbound Access attempt is. If the cell receives the Page Response, it will attempt to setup the call. This leaves open the possibility that the mobile is too weak to be served by the site. This is a common failure in fringe areas of the network.

Old Cell Timeout (OCT).

This failure only occurs during the hand-off process. After the cell sends the hand-off order to the mobile it expects to receive a burst of ST to confirm the order. An OCT occurs if the cell does not receive the confirmation in the proper time frame. The cell will attempt to maintain the call, but these CPF's are often accompanied by Lost Call messages. Customers experiencing large numbers of OCT's may notice more trouble as they move through the network but acceptable service while stationary. Among many causes for this are:

Incorrect programming of the mobile Station Class Mark. Older mobile units were only capable of 666 channel operation. If the unit is programmed for 832 channel operation, the system will assign channels that the mobile cannot tune to.

Little or no mobile ST deviation.

Defective mobile receiver or antenna.

Defective cell radio.

New Cell Timeout (NCT).

This only occurs during the hand-off process. After the mobile has confirmed the hand-off order on the old cell, it switches to the new channel and transponds SAT. Failure of the new cell to detect the proper SAT in the given time frame results in a NCT. When a NCT occurs, there has been a dropped call. This is due to the fact that the mobile has already confirmed the hand-off order on the old channel. The old cell mutes the audio and turns off the old radio almost immediately upon receiving the confirmation. So, failure to detect the mobile on the new channel equates to a lost call. This CPF is sometimes accompanied by a Lost Call message. The user may experience a sudden increase in noise as the mobile attempts to switch to the new channel, followed by a lost call. Among the causes for this problem are:

Co-channel or adjacent channel and co-SAT interference with the old cell. During the locate process, if the potential new cell detects the another mobile on the same channel using the same SAT, bad hand-offs for the correct mobile will result. There is no other ways to identify the mobile during locate other than channel and SAT.

Defective mobile radio.

Defective cell radio.

Glare Condition Mobile Busy (GCMB).

This CPF occurs during call setup attempts. The system outputs this message when it receives an access attempt from a mobile that is already on the system. There are three main causes for this message:

Co-setup channel and co-digital control channel (DCC) interference. This failure occurs if two cells of the system are using the same setup channel and there is interference between them. Both cells detect mobiles trying to access the setup channel. In this scenario, the GCMB is usually accompanied by a VCCF on the other site.

Fraud. GCMB's will result if a mobile unit has been cloned and one user attempts access while another unit is active.

Series One Cell Sites will output GCMB messages if the user attempts access immediately after ending a call. Rapidly repeated access attempts achieve the same result. The older cell sites are relatively slow in "tearing down" the old call.

Call Setup Timeout (CST) or occurs when a cell site does not respond to a call setup order for the indicated voice radio. The call setup is aborted. A call setup timeout indicates a problem with the data links.

Call Shutdown (CS) occurs when the cell site cannot turn off the indicated radio after an internal error shuts down the call. Possible sources of this problem include baseband board or transceiver for Series I cell sites and radio channel unit for Series II cell sites.

Alert Confirmation Failure (ACF) occurs when a mobile unit fails to respond to the alert order sent to it on the indicated voice radio within the time allowed. The mobile unit normally responds to an alert order with a signaling tone (ST) on the assigned voice channel, confirming reception of the order.

Forced Release Time (FRT) out occurs when the cell site did not respond after a forced release order was sent for the indicated radio. As a result, the call was aborted. A forced release timeout indicates a problem with the data links.

New Cell Timeout (NCT) and Old Cell Timeout (OCT) occur during handoff of radio communication between a mobile station and two base stations in the system.

Transmitter Activation Failure (TAF) occurs when the cell site could not turn on the indicated voice radio.

Digital call processing failures include the following which were described above:

ACF or Alert Confirmation Failure, CS or Call Shutdown, CST or Call Setup Timeout, FRT or Forced Release Timeout, GCMB or Glare Condition, Original Mobile Is Busy, and LC or Lost Call. In addition, digital call processing failures include the following:

CDMA Channel Activation Failure (CAF) occurs if the first attempt to active the first channel element failed, there were no free channel elements available to attempt a second activation.

CDMA CE/SH Channel Protocol Failure (CHEF) occurs when lacking of continuity has occurred in the protocol between the channel element at the cell and the speech handler channel at the switch.

CDMA Failure to Establish CE/SH Channel Protocol (FECP) occurs as a result of during call setup, the cell indicated that it could not establish communication with the speech handler channel.

Release Confirmation Failure (RCF) occurs during hard handoff from CDMA to AMPS system.

Setup Channel Glare (SCG) occurs during a mobile unit attempted to originate a call, and the single origination is reported by multiple cells.

CDMA Traffic Channel Confirmation Failure (TCCF) occurs when a call setup, the cell has indicated to the ECPC that the mobile has not responded properly when bringing the mobile to the traffic channel, all resources for the call have been cleared by both the cell and the switch.

By interacting with the display illustrated in FIG. 8, a user of a client computer may view the display data to permit troubleshooting in the radiotelephone system. Preferably, the software operating on the client computer permits mouse click entries and shortcut keys to change the display of the call processing failure data. These are generally consistent with the Windows user interface. For example, in response to use of a mouse to double- click a number in the display 800, the software presents another window displaying detailed data for that call processing failure. FIG. 9 illustrates a detailed display of an analog call processing failure. The detailed data include the telephone number of the mobile station involved in the failed call, the electronic serial number of the mobile station, time of the failure and failure type. FIG. 9 shows similar detailed data for a digital call processing failure. As another example, a mobile search may be performed by entering a mouse click on the displayed phone number or by manually typing in the phone number of the desired mobile station. As yet another example, call processing failure data for different switches can be displayed by activating the pop-up menu behind the switches icon at the top of the display 800.

Referring again to FIG. 7, in response to a detected user input at step 706, at step 708 the client computer determines if the user input is a request for count data. If so, at step 710, a request is sent to the server. At step 712, the requested data are received and at step 714, the requested data are displayed. Control then returns to step 704. If the user input did not correspond to a request for count data, at step 716, the client computer determines if the user input corresponds to a request for a mobile search. If so, step 710, 712 and 714 are repeated to obtain the desired information from the server.

If the user input did not correspond to a request for a mobile search, at step 718, the client computer determines if the user input corresponds to a request to change the switch for which data is currently displayed. If so, steps 710, 712 and 714 are repeated to obtain the desired data and control returns to step 704.

At step 720, the client computer determines if the user input is a request for sort options. If so, at step 724, the client computer receives the input specifying sort option required by the user. At step 726, the display is updated and control then returns to step 704. Lastly, at step 728, the client computer determines if the user has requested other operations. These operations can include, for example, printing the display 800, saving the current data to a file exiting the program and so on. In response to the user input, 724, the display is updated appropriately and control returns to step 704.

From the foregoing, it can be seen that the present embodiment provides an improved method and apparatus for monitoring call processing failure data in a radiotelephone system. The embodiment illustrated herein is a client-server system linked over a network. Client computers may portable and access the network remotely using a wire line modem or wireless link. Data corresponding to call processing failures are presented in summary form and sorted according to user requirements. A convenient and widely used interface such as Windows is provided to permit easy user access to the call processing failure data. Through use of mouse clicks and shortcut keys, sorting may be changed and detailed information on call processing failure counts may be accessed. The connection and cooperation between the client and server are invisible to the user of the client computer. Access to data obtained and stored at the server using a portable client computer allows error diagnosis and troubleshooting in the field.

While a particular embodiment of the present invention has been shown and described, modifications may be made. For example, the system may be opened in conjunction with radiotelephone systems which do not use an OMP with a switch. Other functions and user interface features may be provided as well. It is therefore intended in the appended claims to cover all such changes and modifications which follow in the true spirit and scope of the invention.

What is claimed is:

1. A method for the real-time collection of call processing failures in a radiotelephone network comprising:

receiving call processing failure data from a plurality of switches:

analyzing the call processing failure data at a server;

determining the call processing failure data present:

assigning the call processing failure data to one of a plurality of failure types;

determining the call processing failure type is an analog call processing failure which comprises one of a lost call failure, a voice channel confirmation failure, an alert confirmation failure, a old cell timeout failure, a new cell timeout failure, a glare condition mobile busy failure, a call setup timeout failure, a call shutdown failure, a alert confirmation failure, a forced release time failure, a new cell timeout and old cell timeout failure, and a transmitter activation failure;

incrementing a count for the one of a plurality of failure types;

storing the one of a plurality of failure types and the count for the one of a plurality of failure types;

troubleshooting the one of a plurality of failure types; and transmitting to at least one client the troubleshooting information for the call processing failure data based on the one of a plurality of failure types.

2. A method for the real-time collection of call processing failures in a radiotelephone network comprising:

receiving call processing failure data from a plurality of switches;

analyzing the call processing failure data at a server;

determining the call processing failure data present;

assigning the call processing failure data to one of a plurality of failure types;

determining the call processing failure type is a digital call processing failure which comprises one of a lost call failure, an alert confirmation failure, a glare condition mobile busy failure, a call setup timeout failure, a call shutdown failure, a forced release time failure, a code division multiple access ("CDMA") channel activation failure, CDMA channel element, speech handler ("CE/SH") Channel Protocol Failure, a CDMA failure to establish CE/SH channel protocol, a release confirmation failure, a setup channel glare failure, and a CDMA traffic channel confirmation failure;

incrementing a count for the one of a plurality of failure types;

storing the one of a plurality of failure types and the count for the one of a plurality of failure types;

troubleshooting the one of a plurality of failure types; and transmitting to at least one client the troubleshooting information for the call processing failure data based on the one of a plurality of failure types.

3. A computer readable medium having computer executable software code stored thereon for processing call processing failure data for a radiotelephone system, the computer readable program code comprising:

a first computer readable program code configured for receiving call processing failure data from a plurality of switches;

a second computer readable program code configured for analyzing the call processing failure data at a server;

a third computer readable program code configured for determining the call processing failure data present;

a fourth computer readable program code configured for assigning the call processing failure data to one of a plurality of failure types;

a fifth computer readable program code configured for determining the one of a plurality of failure types is an analog call processing failure;

a sixth computer readable program code configured to determine whether the analog call processing failure comprises one of a lost call failure, a voice channel confirmation failure, an alert confirmation failure, a old cell timeout failure, a new cell timeout failure, a glare condition mobile busy failure, a call setup timeout failure, a call shutdown failure, an alert confirmation failure, a forced release time failure, a new cell timeout and old cell timeout failure, and a transmitter activation failure;

a seventh computer readable program code configured for incrementing a count for the one of a plurality of failure types;

an eighth computer readable program code configured for storing the one of a plurality of a failure types and the count for the one of a plurality of failure types;

a ninth computer readable program code configured for troubleshooting the one of a plurality of failure types; and a tenth computer readable program code configured for transmitting to at least one client the troubleshooting information for the call processing failure data based on the one of a plurality of failure types.

4. A computer readable medium having computer executable software code stored thereon for processing call processing failure data for a radiotelephone system, the computer readable program code comprising:

a first computer readable program code configured for receiving call processing failure data from a plurality of switches;

a second computer readable program code configured for analyzing the call processing failure data at a server;

a third computer readable program code configured for determining the call processing failure data present;

a fourth computer readable program code configured for assigning the call processing failure data to one of a plurality of failure types;

a fifth computer readable program code configured for determining the one of a plurality of failure types is a digital call processing failure;

a sixth computer readable program code configured to determine whether the digital call processing failure comprises one of a lost call failure, an alert confirmation failure, a glare condition mobile busy failure, a call setup timeout failure, a call shutdown failure, a forced release time failure, a CDMA channel activation failure, CDMA CE/SH Channel Protocol Failure, a CDMA failure to establish CE/SH channel protocol, a release confirmation failure, a setup channel glare failure, and a CDMA traffic channel confirmation failure;

a seventh computer readable program code configured for incrementing a count for the one of a plurality of failure types;

an eighth computer readable program code configured for storing the one of a plurality of a failure types and the count for the one of a plurality of failure types;

a ninth computer readable program code configured for troubleshooting the one of plurality of failure types; and a tenth computer readable program code configured for transmitting to at least one client the troubleshooting information for the call processing failure data based the one of a plurality of failure types.

5. A system for monitoring call processing failures in a radiotelephone network, the system comprising:

a server coupled with the radiotelephone network and configured to receive call processing failure data from a plurality of switches;

the server further configured to analyze the call processing failure;

the server further configured to determine the call processing failure data present;

the server further configured to assign the call processing failure data to one of a plurality of failure types;

the server further configured to determine the one of a plurality of failure types comprises one of an analog call processing failure and a digital call processing failure;

the server further configured to determine whether the analog call processing failure comprises one of a lost call failure, a voice channel confirmation failure, an alert confirmation failure, a old cell timeout failure, a new cell timeout failure, a glare condition mobile busy failure, a call setup timeout failure, a call shutdown failure, an alert confirmation failure, a forced release time failure, a new cell timeout and old cell timeout failure, and a transmitter activation failure;

the server further configured to determine whether the digital call processing failure comprises one of a lost call failure, an alert confirmation failure, a glare condition mobile busy failure, a call setup timeout failure, a call shutdown failure, a forced release time failure, a CDMA channel activation failure, CDMA CE/SH Channel Protocol Failure, a CDMA failure to establish CE/SH channel protocol, a release confirmation failure, a setup channel glare failure, and a CDMA traffic channel confirmation failure;

the server further configured to increment a count for the one of a plurality of failure types;

the server further configured to store the one of a plurality of failure types and the count for the one of a plurality of failure types;

the server further configured to troubleshoot the one of a plurality of failure types; and the server further configured to transmit to at least one client the troubleshooting information for the call processing failure data based on the one of a plurality of failure types.

6. The system of claim 5 wherein at least one client comprises a portable computer configured to remotely access the server for display and analysis of the call processing failure data.

7. The system of claim 6 wherein the plurality of clients are configured to selectively display both the real time call processing failure data and the archived data.

8. The system of claim 5 further comprising a local area network coupling the server and the plurality of clients.

9. The system of claim 8 wherein the local area network is an Ethernet network.

10. The system of claim 8 wherein each client of the plurality of clients comprises a personal computer.

* * * * *